United States Patent
Hatazawa (10) Patent No.: US 11,354,194 B2
(45) Date of Patent: Jun. 7, 2022

(54) PROGRAMMABLE DISPLAY DEVICE AND DATA MANAGEMENT METHOD

(71) Applicant: Mitsubishi Electric Corporation, Tokyo (JP)

(72) Inventor: Hikaru Hatazawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/609,779

(22) PCT Filed: Jun. 26, 2019

(86) PCT No.: PCT/JP2019/025385
§ 371 (c)(1),
(2) Date: Nov. 9, 2021

(87) PCT Pub. No.: WO2020/261432
PCT Pub. Date: Dec. 30, 2020

(65) Prior Publication Data
US 2022/0147427 A1    May 12, 2022

(51) Int. Cl.
*G06F 11/00* (2006.01)
*G06F 11/14* (2006.01)
(Continued)

(52) U.S. Cl.
CPC ........ *G06F 11/1448* (2013.01); *G06F 3/0482* (2013.01); *G06F 11/079* (2013.01);
(Continued)

(58) Field of Classification Search
CPC ................ G05B 19/05; G05B 23/0264; G05B 23/0272; G05B 2219/14097;
(Continued)

(56) References Cited

U.S. PATENT DOCUMENTS 9,910,759 B2 *  3/2018  Shivaprasad ....... G06F 11/3017
2011/0295969 A1 * 12/2011  Bernstein .......... G06F 11/1471
709/217

(Continued)

FOREIGN PATENT DOCUMENTS

JP    2007-179115 A    7/2007
JP    2011-65265 A     3/2011
(Continued)

OTHER PUBLICATIONS

Balakrishnan et al., "CORFU: A Distributed Shared Log", ACM Transactions on Computer Systems, vol. 31, No. 4, Article 10, Dec. 2013 (Year: 2013).*

(Continued)

*Primary Examiner* — Michael Maskulinski
(74) *Attorney, Agent, or Firm* — Xsensus LLP (57) ABSTRACT

A programmable display device for a production system that includes a storage device and a plurality of the programmable display devices. The storage device includes a plurality of individual memory areas that store data from the plurality of the programmable display devices individually and are associated with any one of the plurality of the programmable display devices. There is a backup processing unit that loads some or all data that the programmable display device itself retains into an individual memory area associated with the programmable display device itself among the plurality of individual memory areas and a state management unit that updates state management information retained in the storage device when the backup processing unit has performed data update within the individual memory area associated with the programmable display device itself. The state management information indicates that data retained by the plurality of individual memory areas have been updated.

17 Claims, 5 Drawing Sheets

(51) Int. Cl.
  *G06F 11/20* (2006.01)
  *G06F 3/0482* (2013.01)
  *G06F 11/34* (2006.01)
  *G06F 11/07* (2006.01)
(52) U.S. Cl.
  CPC .......... *G06F 11/2017* (2013.01); *G06F 11/34* (2013.01); *G06F 2201/805* (2013.01)
(58) Field of Classification Search
  CPC ..... G06F 11/079; G06F 11/1446–1451; G06F 11/1471; G06F 11/34
  See application file for complete search history.

(56) References Cited

U.S. PATENT DOCUMENTS

| 2015/0029195 | A1 | 1/2015 | Ito et al. |
| 2015/0281000 | A1 | 10/2015 | Iyama et al. |

FOREIGN PATENT DOCUMENTS

| JP | 2013-257790 A | 12/2013 |
| JP | 2015-26347 A | 2/2015 |
| JP | 2015-194878 A | 11/2015 |
| WO | WO-2020089963 A1 * | 5/2020 |

OTHER PUBLICATIONS

International Search Report and Written Opinion dated Aug. 20, 2019, received for PCT Application PCT/JP2019/025385, Filed on Jun. 26, 2019, 10 pages including English Translation, Written opinion is not translated.

Decision to Grant dated Mar. 24, 2020, received for JP Application 2020-504729, 5 pages including English Translation.

* cited by examiner

| NUMBER | NAME | SELECT |
|---|---|---|
| 1 | DISPLAY DEVICE A (192.168.3.18) | VIEW |
| 2 | DISPLAY DEVICE B (192.168.3.19) | VIEW |
| 3 | DISPLAY DEVICE C (192.168.3.20) | VIEW |
| ... | ... | ... |

FIG.8

| | DATE AND TIME | TEMPERATURE a | TEMPERATURE b | TEMPERATURE c | ... | JUDGMENT |
|---|---|---|---|---|---|---|
| 1 | 20xx/mm/dd 15:05 | 20.5 | 21.1 | 20.9 | ... | NORMAL |
| 2 | 20xx/mm/dd 15:10 | 20.6 | 21.5 | 20.9 | ... | NORMAL |
| 3 | 20xx/mm/dd 15:15 | 20.8 | 23.1 | 21.0 | ... | ANOMALOUS |
| 4 | 20xx/mm/dd 15:20 | 20.7 | 21.8 | 21.1 | ... | NORMAL |
| 5 | 20xx/mm/dd 15:25 | 20.7 | 21.6 | 21.0 | ... | NORMAL |
| ... | ... | ... | ... | ... | ... | ... |

PROGRAMMABLE DISPLAY DEVICE AND DATA MANAGEMENT METHOD

CROSS-REFERENCE TO RELATED APPLICATION

The present application is based on PCT filing PCT/JP2019/025385, filed Jun. 26, 2019, the entire contents of which are incorporated herein by reference.

FIELD

The present invention relates to a programmable display device that functions to manage data obtained, for example, at a production site and also relates to a data management method.

BACKGROUND

On a large-scale production site, a certain product may be mass produced, for example, with a plurality of production lines. In this case, there are a number of programmable display devices that operate similarly on the same program. Moreover, a single production line may have multiple programmable display devices.

When the production line stops producing due to some trouble, cause investigation and restoration need to be done as soon as possible. The trouble can be caused by various factors including failures in production equipment, problems in a control program for the equipment, and human errors. With these circumstances taken into account, a typical programmable display device has a function of keeping log data that includes, in association with time information, various information telling an operating state of the production line. Examples of the information associated with the time information include environmental information on the production site, such as temperature and humidity, and information indicating contents of operations that a worker on the production line has performed on production apparatuses such as a robot. If the programmable display device itself fails, the log data may become unavailable for a check. Therefore, backing up data that the programmable display device retains is desirable. In addition to the above log data, examples of the data to be backed up include an operating program installed on the programmable display device, drawing data that is data on screens to be displayed, and operating parameters that a user has set for the programmable display device.

According to an invention described in Patent Literature 1, a plurality of programmable display devices connected via a network perform mutual backups by obtaining and retaining backup data from one another.

CITATION LIST

Patent Literature

Patent Literature 1: Japanese Patent Application Laid-open No. 2013-257790

SUMMARY

Technical Problems

According to the invention described in Patent Literature 1, a user presets the combination of programmable display devices that are to perform mutual backups, and each of the programmable display devices receives and transmits the backup data from and to another programmable display device, which is set as a mutual backup partner. Therefore, normal mutual backup operation will not be available when a configured system, after having started operating, has an added programmable display device or a new programmable display device replacing a failed one, that is to say, when there is a change in programmable display device organization connected to the network. For example, when there is the added programmable display device, in order to enable data of the added programmable display device to be backed up, the user needs to specify the programmable display device that is to perform mutual backups with the added programmable display device and also needs to do necessary settings with both the programmable display devices for the mutual backup operation. When the programmable display device has been replaced, for the mutual backup operation, the user needs to do necessary settings with the replacement programmable display device and the programmable display device that is to perform mutual backups with the replacement programmable display device. With the invention described in Patent Literature 1, the user has to change the settings necessary for the mutual backup operation every time there is a change in the programmable display device organization connected to the network, thus problematically having a heavy workload. In an alternative to the mutual backup among the programmable display devices, a separate backup device that collectively retains backup data from a plurality of programmable display devices is conceivable for data backups to be performed. In the above alternative, however, when, for example, common data that is used by two or more programmable display devices, such as the drawing data or the operating parameters, has been updated by one of the programmable display devices, and the backup data retained by the backup device has been updated accordingly, another of the programmable display devices that needs the updated data cannot detect this for automatically updating its retained data. Therefore, a user has to spend time and effort doing a data update setting with the programmable display device that needs the data update.

The present invention has been made in view of the above, and an object of the present invention is to obtain a programmable display device that enables a user to have a lighter workload relating to data backups after start of operation of a production system.

Solution to Problems

In order to solve the above-stated problems and achieve the object, a programmable display device according to the present invention is to be included in a production system that includes a storage device and a plurality of the programmable display devices. The storage device includes a plurality of individual memory areas that store data from the plurality of the programmable display devices individually and are associated with any one of the plurality of the programmable display devices. The programmable display device includes a backup processing unit that loads some or all data that the programmable display device itself retains into an individual memory area associated with the programmable display device itself among the plurality of individual memory areas. The programmable display device also includes a state management unit that updates state management information retained in the storage device when the backup processing unit has performed data update within the individual memory area associated with the programmable display device itself. The state management information indicates that data retained by the plurality of individual memory areas have been updated.

Advantageous Effect of Invention

The programmable display device according to the present invention loads the backup of the data into the individual memory area associated with the programmable display device itself among the individual memory areas of the storage device in the production system, so that when the production system has a change, such as an added programmable display device or a replacement programmable display device, setting the added or replacement programmable display device is all that is to be done. Therefore, a user is enabled to have a lighter workload relating to data backups after start of operation of the production system.

DESCRIPTION OF EMBODIMENT

With reference to the drawings, a detailed description is hereinafter provided of a programmable display device and a data management method according to an embodiment of the present invention. It is to be noted that this embodiment is not restrictive of the present invention.

Embodiment

Figure 1:
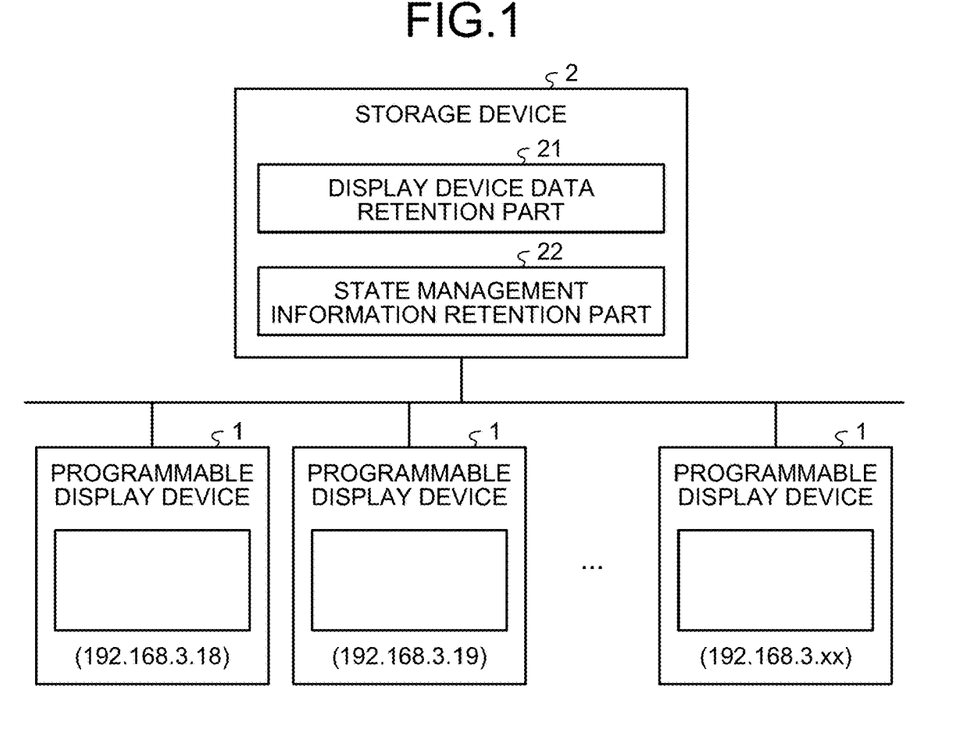
FIG. 1 illustrates a configuration example of a production system where a programmable display device according to an embodiment of the present invention is applied.

FIG. 1 illustrates a configuration example of a production system where a programmable display device 1 according to the embodiment of the present invention is applied. The production system illustrated in FIG. 1 includes a plurality of the programmable display devices 1 installed on a factory production site including production lines and others, and a storage device 2 that receives and stores data from the programmable display devices 1. The programmable display devices 1 and the storage device 2 each include a communication function, and the programmable display devices 1 are connected to the storage device 2 via a network. The programmable display devices 1 may be connected directly to the storage device 2 instead of being connected to the storage device 2 via the network. Although not illustrated, an external device such as a programmable logic controller (PLC) is connected to each of the programmable display devices 1. The programmable display device 1 receives various information from the external device, and its display unit (not illustrated) presents a display based on the received information.

In the production system illustrated in FIG. 1, the programmable display devices 1 use the storage device 2 as common storage, and each programmable display device 1 performs a data backup by writing some or all of its various data that the programmable display device 1 itself retains to the storage device 2. Moreover, each programmable display device 1 functions to obtain, from among the backup data, which are data backups in the storage device 2, the backup of the data of another programmable display device 1 for display on its the display unit. Each programmable display device 1 has identification information unique to the programmable display device 1. Examples of the identification information unique to the programmable display device 1 include an Internet Protocol (IP) address, a media access control (MAC) address, and a serial number set by a user, among others. In a description below, the IP address is used as the identification information unique to the programmable display device 1. The IP addresses given to the programmable display devices 1 in FIG. 1 are "192.168.3.18" and "192.168.3.19" to "192.168.3.xx". In the following description, the programmable display device may be referred to simply as "display device".

The storage device 2 includes a display device data retention part 21 that retains the data from the display devices 1, and a state management information retention part 22 that retains state management information indicating a state of the data retained by the display device data retention part 21. The state of the data herein refers to information that shows whether or not the data have been updated.

Figure 2:
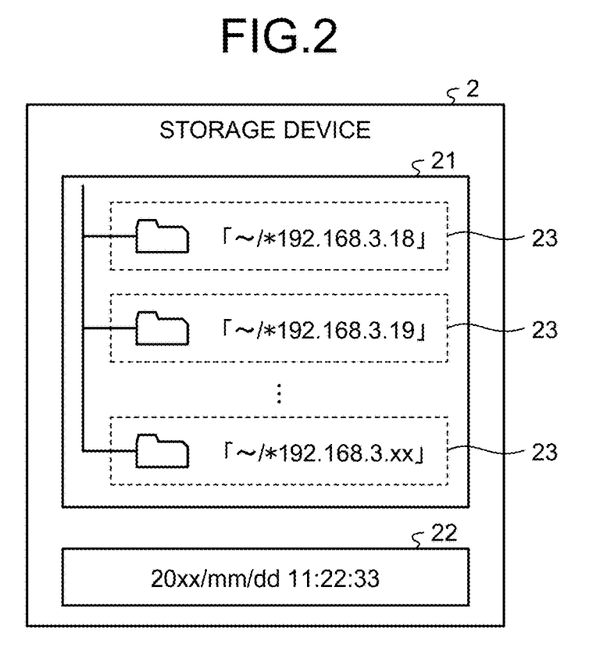
FIG. 2 illustrates a configuration example of a storage device according to the embodiment.

FIG. 2 illustrates a configuration example of the storage device 2 according to the embodiment. The display device data retention part 21 of the storage device 2 includes individual memory areas 23. In the form of a folder, each of the individual memory areas 23 stores the data from the display device 1 individually for each data sender, namely, each display device 1. The folders serving as the individual memory areas 23 are each given a name that includes the information unique to the display device 1, which sends data to be stored. As FIG. 2 illustrates, the name of each folder serving as the individual memory area 23 includes, in the present embodiment, the IP address given to the display device 1, which sends the data to be stored. When performing the data backup using the storage device 2, each display device 1 loads the backup data into the individual memory area 23 that includes the IP address of its own in the name. Before loading the backup data, each display device 1 creates a new individual memory area 23 named to include the IP address of its own if the display device data retention part 21 has no individual memory area 23 with the name including the IP address of its own.

The state management information retention part 22 retains timestamp information as the state management information. The timestamp information indicates a date and time of last occurrence of data update in the display device data retention part 21. The timestamp information in the state management information retention part 22 is updated by the display device 1 that has loaded the backup data into the individual memory area 23. In other words, each display device 1 updates the timestamp information, which is the state management information retained by the state management information retention part 22, when loading the backup data into the individual memory area 23. Specifically, the display device 1 that has loaded the backup data into the individual memory area 23 updates the timestamp information to timestamp information indicating a date and time that the backup data has been loaded into the individual memory area 23.

Figure 3:
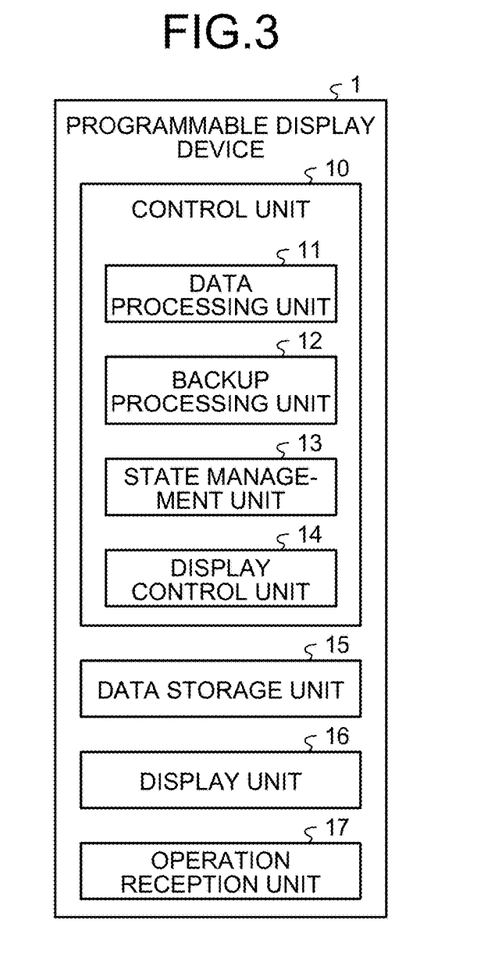
FIG. 3 illustrates an example of a functional block configuration of the programmable display device according to the embodiment.

FIG. 3 illustrates an example of a functional block configuration of each programmable display device 1 according to the embodiment. The programmable display device 1 includes a control unit 10, a data storage unit 15, the display unit 16, and an operation reception unit 17. The control unit 10 includes a data processing unit 11, a backup processing unit 12, a state management unit 13, and a display control unit 14.

The data processing unit 11 performs processes that include receiving and analyzing data from the connected external device such as the PLC and storing the received data in the data storage unit 15, among others.

The backup processing unit 12 performs a backup process of making a copy of data that needs to be backed up among data stored in the data storage unit 15 and loading the copy into the above-described display device data retention part 21 of the storage device 2.

When the backup processing unit 12 has performed the backup process, the state management unit 13 updates the state management information retained by the state management information retention part 22 of the storage device 2. When a given condition is satisfied, the state management unit 13 checks the state management information retained by the state management information retention part 22 of the storage device 2 to judge whether or not the backup data retained by the display device data retention part 21 have been updated.

The display control unit 14 creates drawing data for screens that are to be displayed by the display unit 16 and has the display unit 16 present displays based on the drawing data.

The data storage unit 15 retains various data, specifically image data that are used for creating the drawing data for the screens to be displayed by the display unit 16, screen layout data, an operating program for the display device 1, measured data from the external device, and log data showing an operating state of the production line having the display device 1, among others.

The display unit 16 displays the various screens such as a menu screen, a settings screen, a monitor screen for operating states of apparatuses installed in the production line, and a confirmation screen for the data stored in the data storage unit 15.

The operation reception unit 17 accepts operations from the user, generates signals each indicating what the accepted operation contains, and outputs the signals to the control unit 10.

Figure 4:
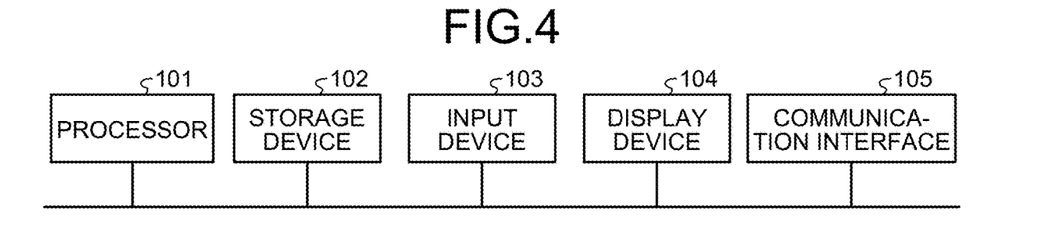
FIG. 4 illustrates an example of hardware that is used to implement the programmable display device according to the embodiment.

A description is provided here of hardware that is used to implement the programmable display device 1 according to the present embodiment. FIG. 4 illustrates an example of the hardware, which is used to implement the programmable display device 1 according to the embodiment. The programmable display device 1 is implementable with a processor 101, a storage device 102, an input device 103, a display device 104, and a communication interface 105 that are illustrated in FIG. 4. The storage device 102 illustrated in FIG. 4 differs from the storage device 2 illustrated in FIGS. 1 and 2.

Examples of the processor 101 include a central processing unit (CPU) that is also referred to as a processing unit, an arithmetic unit, a microprocessor, a microcomputer, or a digital signal processor (DSP), and a system large-scale integration (system LSI). The storage device 102 is, for example, a random-access memory (RAM), a read-only memory (ROM), an erasable programmable read-only memory (EPROM), an electrically erasable programmable read-only memory (EEPROM) (registered trademark), or a hard disk drive. The storage device 102 may be removable from the programmable display device 1. The input device 103 and the display device 104 refer to, for example, a touch panel that is an assembly of an input device and a display device.

The data processing unit 11, the backup processing unit 12, the state management unit 13, and the display control unit 14 of the programmable display device 1 are implemented when programs that operate as these units are executed by the processor 101. The programs that operate as the data processing unit 11, the backup processing unit 12, the state management unit 13, and the display control unit 14 are prestored in the storage device 102. The processor 101 reads and executes the above programs from the storage device 102 to operate as the data processing unit 11, the backup processing unit 12, the state management unit 13, and the display control unit 14.

The data storage unit 15 is implemented with the storage device 102, and the display unit 16 of the programmable display device 1 is implemented with the display device 104. The operation reception unit 17 is implemented with the input device 103. The communication interface 105 is used when the programmable display device 1 communicates with another device such as the storage device 2. The communication interface 105 is, for example, a network interface card.

The programs that operate as the data processing unit 11, the backup processing unit 12, the state management unit 13, and the display control unit 14 are assumed to have been prestored in the storage device 102; however, this is non-limiting. The above programs may be written onto a storage medium such as a compact disc ROM (CD-ROM) or a digital versatile disc ROM (DVD-ROM) to be supplied to the user and installed on the storage device 102 by the user. In that case, hardware that is used to implement the programmable display device 1 includes a reading device that reads the programs from the storage medium or an interface circuit that is used for connection to the reading device. The above programs may be provided for the user via a communication line for the Internet or the like to be installed on the storage device 102.

A description is provided next of overall operation of the programmable display device 1. In the present embodiment, how the programmable display device 1 operates when loading a backup of data into the storage device 2 and how the programmable display device 1 operates when displaying backup data retained in the storage device 2 are described separately.

Figure 5:
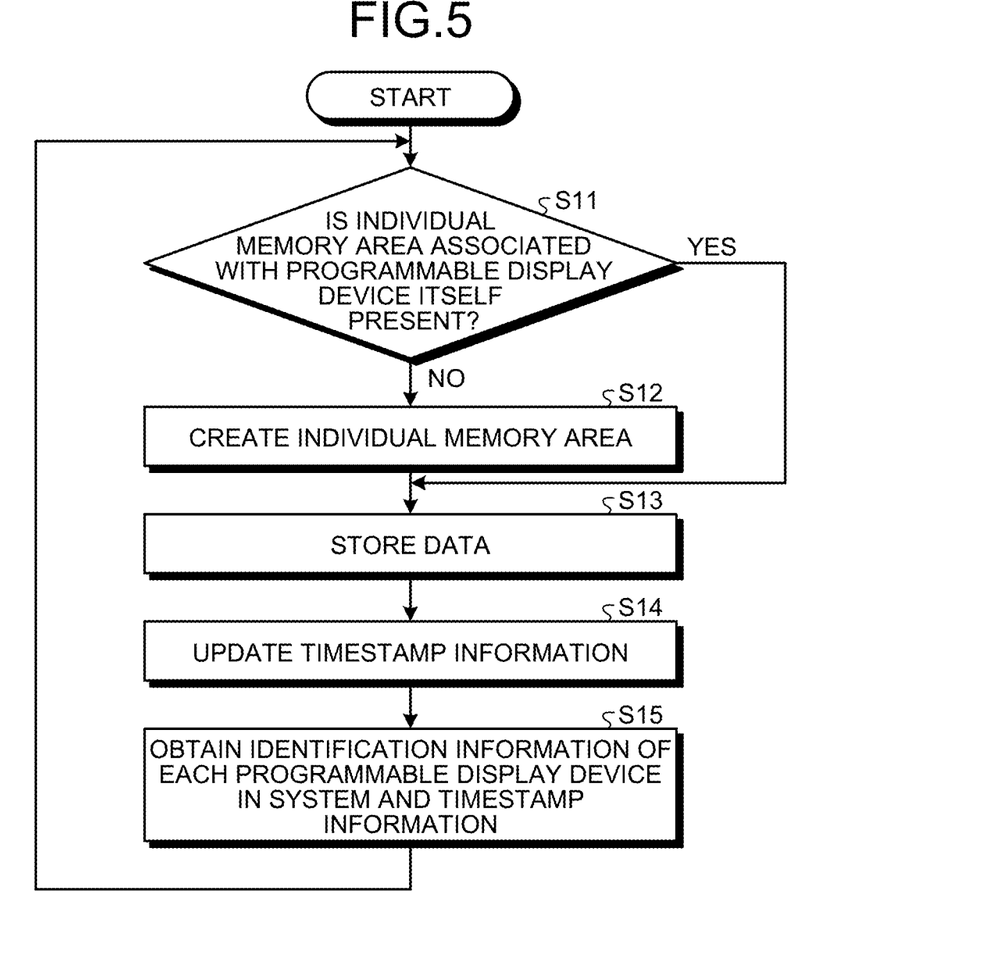
FIG. 5 is a flowchart illustrating an example of how the programmable display device according to the embodiment operates when loading a backup of data into the storage device.

FIG. 5 is a flowchart illustrating an example of how the programmable display device 1 according to the embodiment operates when loading the backup of the data into the storage device 2. In the backup operation illustrated in FIG. 5, steps S11 to S13 are executed by the backup processing unit 12, and steps S14 and S15 are executed by the state management unit 13.

After being started up to begin operating, the display device (programmable display device) 1 starts the operation illustrated in FIG. 5 when a predetermined condition is satisfied. For example, when a fixed period of time set by the user has elapsed since the display device 1 has begun operating, the backup operation by the display device 1 starts with ascertaining whether or not the display device data retention part 21 of the storage device 2 has the individual memory area 23 associated with the display device 1 itself (step S11). If the display device 1 recognizes the existence of the individual memory area 23 that includes the IP address of its own in the name, the display device 1 determines that the individual memory area 23 associated with the display device 1 itself is present.

If the display device 1 does not recognize the existence of the individual memory area 23 associated with the display device 1 itself (step S11: No), the display device 1 creates an individual memory area 23 in the display device data retention part 21 of the storage device 2 for loading its backup data (step S12). In other words, the display device 1 creates the individual memory area 23 named to include the IP address of its own. After executing step S12, the display device 1 stores the data in the individual memory area 23 associated with the display device 1 itself (step S13). The data that the display device 1 stores at step S13 may be the backup of some or all of the data retained in the data storage unit 15. The data to back up is assumed to have been specified by the user before the programmable display device 1 begins operating. Examples of the data that the user specifies for the backup include the log data, which shows the operating state of the production line, and measurements from a sensor installed in the production line, among others.

When, for example, a factory includes a plurality of identical production lines, it is conceivable here that multiple display devices 1 in the production system operate similarly to one another. If the operating program is included in the data to be backed up here, the multiple display devices 1 store the same operating program in the storage device 2, thus performing redundant backups. Therefore, for the same data contents that may be retained by the multiple display devices 1, such as the operating program and the drawing data for the screens, the display device 1 may ascertain at step S13 whether or not another display device 1 has already backed up the same data. If the same data have not been backed up, the display device 1 may store such data in the storage device 2. The display device 1 could determine whether or not the different display device 1 has already backed up the same data as its data to be backed up by checking version information on the data or comparing names, dates and times of creation, data sizes, and others of data files. Since the display device 1 determines whether to actually back up or not by ascertaining whether or not the different display device 1 has already backed up the data to be backed up, larger than necessary sizes of the memory areas (the display device data retention part 21) of the storage device 2 are preventable. Moreover, the display device 1 is enabled to access the storage device 2 in a shorter time, and concurrent accesses to the storage device 2 by two or more display devices 1 can decrease in frequency.

After the display device 1 executes step 13, that is to say, after the display device 1 stores the backup of the data in the individual memory area 23 associated with the display device 1 itself, the display device 1 updates the timestamp information retained by the state management information retention part 22 of the storage device 2 to a value indicating a current dare and time (step S14). Next, the display device 1 obtains the identification information of each of the display devices 1 in the production system and the timestamp information (step S15). At step S15, the display device 1 checks the respective names of the individual memory areas 23 in the display device data retention part 21 of the storage device 2 to obtain the IP addresses from the names, and obtains the timestamp information retained by the state management information retention part 22. The display device 1 stores the obtained information (the identification information of each display device 1 in the production system and the timestamp information) in the data storage unit 15.

If the display device 1 determines at above-described step S11 that the individual memory area 23 associated with the display device 1 itself is present (step S11: Yes), the display device 1 executes step 313.

When, for example, a fixed period of time has elapsed since the execution of above-described step 315, the display device 1 executes above-described steps 311 to S15 again. In other words, the display device 1 repeats the above-described backup operation each time the fixed period of time elapses.

Figure 6:
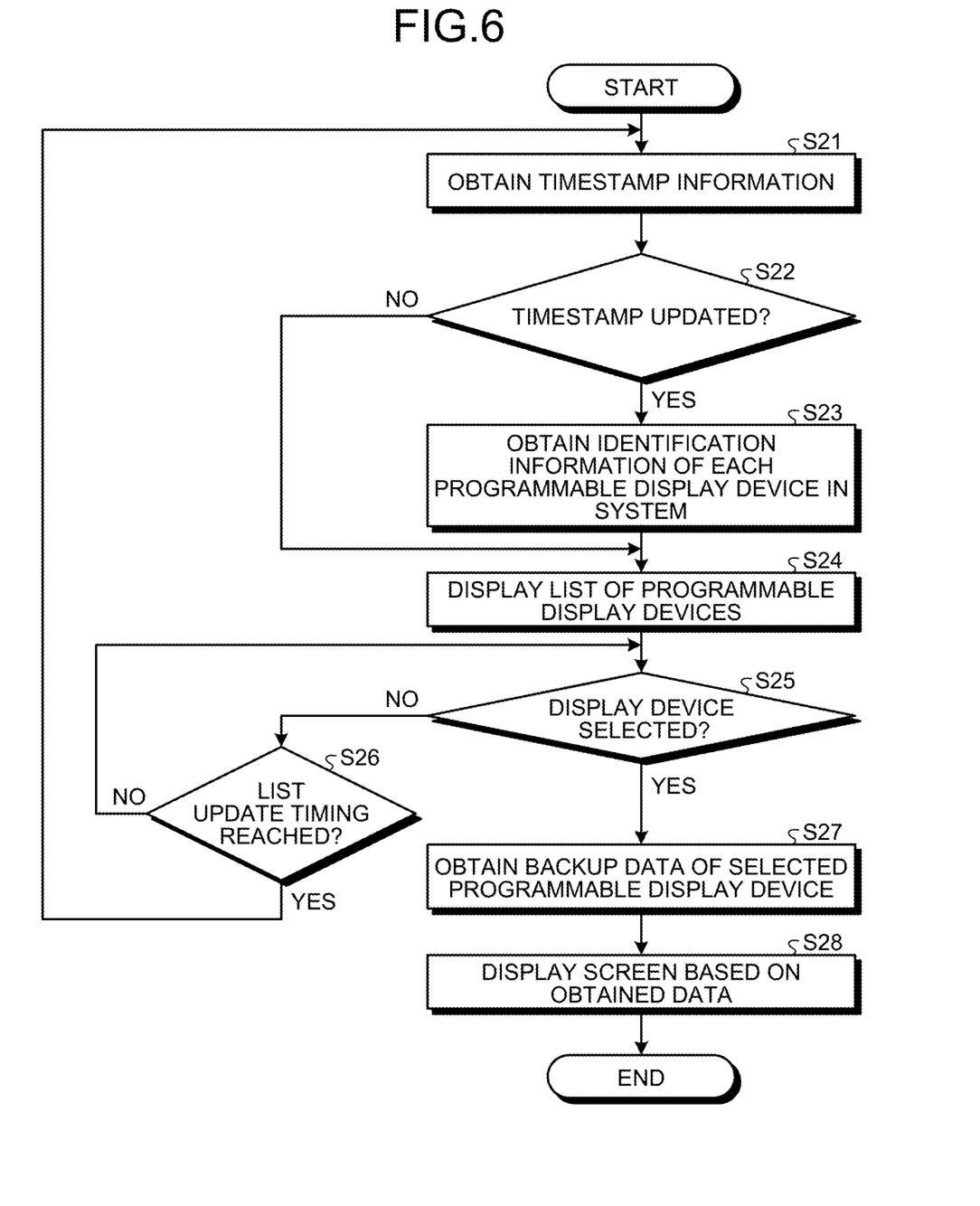
FIG. 6 is a flowchart illustrating an example of how the programmable display device according to the embodiment operates when displaying backup data from the storage device.

FIG. 6 is a flowchart illustrating an example of how the programmable display device 1 according to the embodiment operates when displaying the backup data from the storage device 2.

Upon accepting, from the user, an operation for starting a check on the backup data in the storage device 2, the display device 1 starts the operation illustrated in FIG. 6. When the display device 1 has begun operating, the display device 1 obtains the timestamp information from the storage device 2 first (step S21) and ascertains whether or not the obtained timestamp information has been updated (step S22). In other words, the display device 1 compares the obtained timestamp information with the timestamp information that the display device 1 has obtained and retained at above-described step S15 in the backup operation. If the two are different, the display device 1 determines that the update has occurred. The ascertainment at step S22 is performed by the state management unit 13.

If the timestamp information has been updated (step S22: Yes) as a result of a change in the state of the backup data retained in the storage device 2 due to a display device 1 newly connected to the network or as a result of update of the backup data retained in the storage device 2 by the existing display device 1, the display device 1 obtains the identification information of each display device 1 in the production system (step S23). Specifically, the display device 1 checks the respective names of the individual memory areas 23 in the display device data retention part 21 of the storage device 2 and obtains the IP addresses from the names. Step S23 is executed by the backup processing unit 12.

Next, the display device 1 displays a list of the display devices 1 in the production system (step S24). The list that the display device 1 displays after executing step S23 is based on the identification information of each display device 1 that has been obtained at step S23. Step S24 is executed by the display control unit 14.

Figure 7:
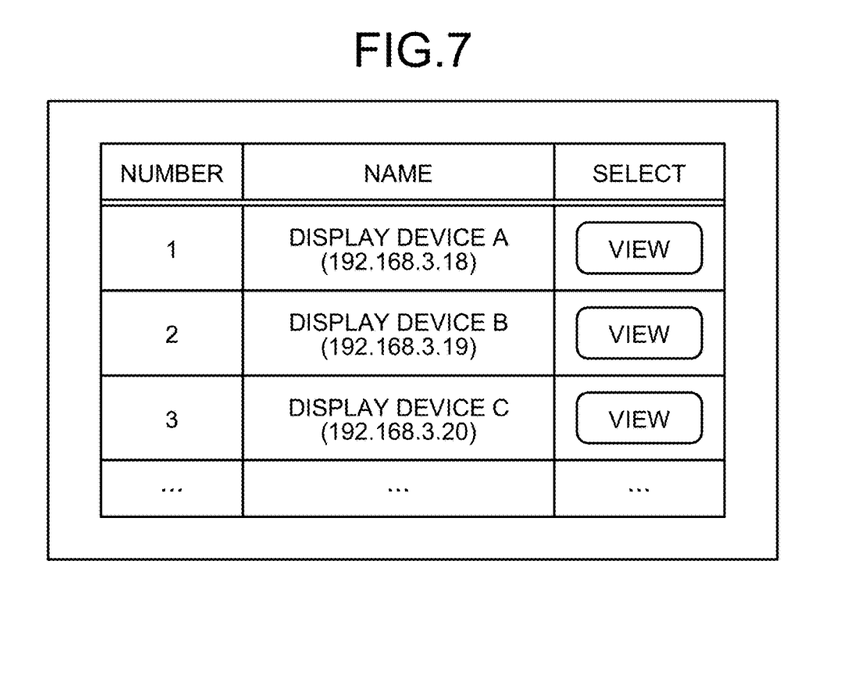
FIG. 7 illustrates a first screen example that is displayed by the programmable display device according to the embodiment.

On the other hand, if no update of the timestamp information has been determined at above-described step S22 (step S22: No), a list is displayed on the basis of the identification information of each display device 1 that has been obtained and retained at above-described step S15 in the backup operation (step S24). The list of the display devices 1 that the display device 1 displays on the display unit 16 at step S24 has, for example, a configuration illustrated in FIG. 7. The list illustrated in FIG. 7 is the example of having names of the display devices 1 displayed; however, this presentation method is non-limiting. Displayed next to the names are "VIEW" buttons that each enable display of the backup data of the display device 1 having the displayed name for a content check.

After displaying the list of the display devices 1 in the production system, the display device 1 confirms whether or not the display device 1 has been selected from the list, namely, whether or not the "VIEW" button illustrated in FIG. 7 has been pressed (step S25). Step S25 is executed by the display control unit 14.

If no display device 1 has been selected from the list displayed (step S25: No), the display device 1 ascertains whether or not a list update timing has been reached (step S26). Step S26 is executed by the display control unit 14. For example, when a previously fixed period of time has elapsed since the list display has been started by the execution of step S24, the display control unit 14 determines that the list update timing has been reached. If the list update timing has not been reached (step S26: No), the display device 1 returns to step S25 to continue operating. On the other hand, if the list update timing has been reached (step S26: Yes), the display device 1 returns to step S21 to continue operating.

If the display device 1 has been selected from the list displayed (step S25: Yes), the display device 1 obtains, from the storage device 2, the backup data of the selected display device 1, namely, the data that the selected display device 1 has stored in the storage device 2 (step S27). At step S27, the backup processing unit 12 obtains the data from the individual memory area 23 that includes the IP address of the selected display device 1 in the name.

Figure 8:
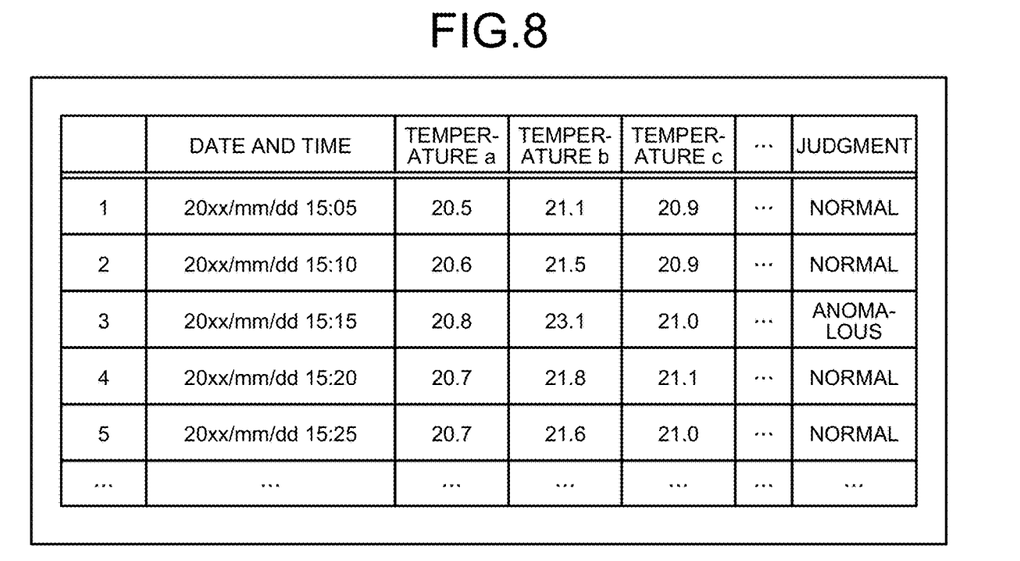
FIG. 8 illustrates a second screen example that is displayed by the programmable display device according to the embodiment.

Next, the display device 1 has the display unit 16 display a screen based on the data obtained at step S27, namely, the screen for the user to run a content check on the obtained data (step S28). When the data obtained at step S27 includes, for example, the log data, the display control unit 14 of the display device 1 has the display unit 16 display a screen having a configuration such as illustrated in FIG. 8 for a log data check.

Thus the display device 1 has the function of obtaining the backup data of another display device 1 that is retained in the storage device 2 and displaying the screen for the user to run the content check on the obtained backup data. Therefore, when, for example, the different display device 1 has failed, the display device 1 is capable of obtaining the generated log data of the different display device 1 that has failed and displaying the contents of the log data for the check by the user. The user checks the displayed log data for, for example, investigating what has caused the failure, thus being enabled to make effective use of the backup data.

In the present embodiment, the timestamp information is used as the state management information that indicates the state of the data retained by the display device data retention part 21 of the storage device 2 but is non-limiting. The state management information may be, for example, a value that counts up after every update, as long as the state management information shows each display device 1 in the production system whether or not the backup data stored in the storage device 2 have been updated. In that case, at step S14 illustrated in FIG. 5, the display device 1 increments the state management information that is retained as the value by the state management information retention part 22 of the storage device 2. Each display device 1 in that case determines that the backup data stored in the storage device 2 have been updated when the state management information in the data storage unit 15 differs in value from the state management information in the state management information retention part 22 of the storage device 2.

As described above, each of the plurality of the programmable display devices 1 in the production system according to the present embodiment creates, in the storage device 2, the individual memory area 23 that is named to be recognizable as being associated with the programmable display device 1 itself by the other programmable display devices 1 and loads the backup of its data into the individual memory area 23 associated with the programmable display device 1 itself. Since each programmable display device 1 creates the individual memory area 23 for its own use in the display device data retention part 21 of the storage device 2, when there is an added programmable display device 1 or a replacement programmable display device 1, the user does not need to do work, such as changing settings of the existing programmable display devices 1. In other words, setting the added or replacement programmable display device 1 (for data backups to be performed) is all that is to be done. Therefore, the programmable display device 1 enables the user to have a lighter workload relating to data backups after start of operation of the production system.

Moreover, each of the plurality of the programmable display devices 1 recognizes the configuration of the production system, in other words, the other programmable display devices 1 that each load the backup of the data into the storage device 2 by checking the names of the individual memory areas 23 created in the storage device 2 and displays the list of the programmable display devices 1 in response to the user request. When the user has specified one of the listed programmable display devices 1, the screen is displayed for the user to run a content check on the backup data of the specified programmable display device 1. This enables improved convenience.

Simply retaining the data received from each programmable display device 1 is all that is to be done by the storage device 2, so that there is no need for the storage device 2 to function as a database that enables retrieval of data meeting a specified condition. This enables the storage device 2 to be implemented with a low-throughput computer for reduced costs of the production system.

The above configurations illustrated in the embodiment are examples of contents of the present invention, can be combined with other techniques that are publicly known, and can be partly omitted or changed without departing from the gist of the present invention.

REFERENCE SIGNS LIST

1 programmable display device; 2 storage device; 10 control unit; 11 data processing unit; 12 backup processing unit; 13 state management unit; 14 display control unit; 15 data storage unit; 16 display unit; 17 operation reception unit; 21 display device data retention part; 22 state management information retention part; 23 individual memory area.

The invention claimed is:

1. A programmable display device to be included in a production system that includes a storage device and a plurality of the programmable display devices, the storage device including a plurality of individual memory areas that store data from the plurality of the programmable display devices individually and are associated with any one of the plurality of the programmable display devices, the programmable display device comprising:

backup processing circuitry to load some or all data that the programmable display device itself retains into an individual memory area associated with the programmable display device itself among the plurality of individual memory areas; and state management circuitry to update state management information retained in the storage device when the backup processing circuitry has performed data update within the individual memory area associated with the programmable display device itself, the state management information indicating that data retained by the plurality of individual memory areas have been updated and being common to programmable display devices in the production system.

2. The programmable display device according to claim 1, wherein the backup processing circuitry creates an individual memory area in the storage device if the storage device has no individual memory area associated with the programmable display device itself, gives a name including information unique to the programmable display device itself to an individual memory area created, and loads some or all data that the programmable display device itself retains into an individual memory area created.

3. The programmable display device according to claim 2, further comprising display control circuitry to have a display display a list of the plurality of the programmable display devices in the production system on the basis of respective names of the plurality of individual memory areas and have the display present a display based on backup data read from an individual memory area associated with a user-selected one of the plurality of the programmable display devices.

4. The programmable display device according to claim 3, wherein after updating the state management information, the state management circuitry name-checks the plurality of individual memory areas to obtain and retain identification information from each of the individual memory areas, the identification information being unique to a programmable display device associated with the individual memory area, and obtains and retains the state management information updated, and when state management information obtained and retained by the state management circuitry is identical with state management information retained in the storage device, the display control circuitry has the display display the list on the basis of the identification information already obtained by the state management circuitry.

5. The programmable display device according to claim 4, wherein the state management information is timestamp information indicating a date and time that data in the individual memory areas have been updated.

6. The programmable display device according to claim 5, wherein the backup processing circuitry skips loading, into an individual memory area associated with the programmable display device itself, data that is retained by the programmable display device itself and is already loaded into the storage device by another of the plurality of the programmable display devices.

7. The programmable display device according to claim 4, wherein the backup processing circuitry skips loading, into an individual memory area associated with the programmable display device itself, data that is retained by the programmable display device itself and is already loaded into the storage device by another of the plurality of the programmable display devices.

8. The programmable display device according to claim 3, wherein the state management information is timestamp information indicating a date and time that data in the individual memory areas have been updated.

9. The programmable display device according to claim 8, wherein the backup processing circuitry skips loading, into an individual memory area associated with the programmable display device itself, data that is retained by the programmable display device itself and is already loaded into the storage device by another of the plurality of the programmable display devices.

10. The programmable display device according to claim 3, wherein the backup processing circuitry skips loading, into an individual memory area associated with the programmable display device itself, data that is retained by the programmable display device itself and is already loaded into the storage device by another of the plurality of the programmable display devices.

11. The programmable display device according to claim 2, wherein the state management information is timestamp information indicating a date and time that data in the individual memory areas have been updated.

12. The programmable display device according to claim 11, wherein the backup processing circuitry skips loading, into an individual memory area associated with the programmable display device itself, data that is retained by the programmable display device itself and is already loaded into the storage device by another of the plurality of the programmable display devices.

13. The programmable display device according to claim 2, wherein the backup processing circuitry skips loading, into an individual memory area associated with the programmable display device itself, data that is retained by the programmable display device itself and is already loaded into the storage device by another of the plurality of the programmable display devices.

14. The programmable display device according to claim 1, wherein the state management information is timestamp information indicating a date and time that data in the individual memory areas have been updated.

15. The programmable display device according to claim 14, wherein the backup processing circuitry skips loading, into an individual memory area associated with the programmable display device itself, data that is retained by the programmable display device itself and is already loaded into the storage device by another of the plurality of the programmable display devices.

16. The programmable display device according to claim 1, wherein the backup processing circuitry skips loading, into an individual memory area associated with the programmable display device itself, data that is retained by the programmable display device itself and is already loaded into the storage device by another of the plurality of the programmable display devices.

17. A data management method for a production system that includes a storage device and a plurality of programmable display devices, the storage device including a plurality of individual memory areas that store data from the plurality of programmable display devices individually and are associated with any one of the plurality of programmable display devices, the data management method comprising:

loading, by each of the plurality of programmable display devices, some or all data that the programmable display device itself retains into an individual memory area associated with the programmable display device itself among the plurality of individual memory areas; and updating, by each of the plurality of programmable display devices, state management information retained in the storage device when the programmable display device has performed data update within the individual memory area associated with the programmable display device itself, the state management information indicating that data retained by the plurality of individual memory areas have been updated and being common to programmable display devices in the production system.

* * * * *